US00RE44112E

(19) United States
(12) Reissued Patent
Riegl

(10) Patent Number: US RE44,112 E
(45) Date of Reissued Patent: Apr. 2, 2013

(54) LASER SCANNER

(75) Inventor: Johannes Riegl, Trabenreith (AT)

(73) Assignee: RIEGL Laser Measurement Systems GmbH, Horn (AT)

(21) Appl. No.: 29/395,693

(22) Filed: Mar. 13, 2012

Related U.S. Patent Documents

Reissue of:
(64) Patent No.: Des. 638,318
Issued: May 24, 2011
Appl. No.: 29/357,835
Filed: Mar. 18, 2010

(30) Foreign Application Priority Data

Sep. 18, 2009 (EM) ..... 001613274-0002
Sep. 18, 2009 (EM) ..... 001613274-0004

(51) LOC (9) Cl. ..... 10-04
(52) U.S. Cl. ..... D10/66
(58) Field of Classification Search ..... D10/66, D10/69; 340/522; 356/73, 139.04, 399; 359/212.1, 629
See application file for complete search history.

(56) References Cited

U.S. PATENT DOCUMENTS

| | | | | | |
|---|---|---|---|---|---|
| 2,220,884 | A | * | 11/1940 | Burka et al. | 356/149 |
| 4,676,598 | A | * | 6/1987 | Markley et al. | 359/212.1 |
| 4,772,875 | A | * | 9/1988 | Maddox et al. | 340/522 |
| 4,830,489 | A | * | 5/1989 | Cain et al. | 356/73 |
| 5,144,486 | A | * | 9/1992 | Hart | 359/629 |
| D375,464 | S | * | 11/1996 | Hoshino | D10/66 |
| 5,686,996 | A | * | 11/1997 | Fidler et al. | 356/399 |
| D509,761 | S | * | 9/2005 | Kallabis | D10/69 |
| D528,022 | S | * | 9/2006 | Kallabis | D10/69 |
| D563,247 | S | * | 3/2008 | Ishii | D10/66 |
| D587,148 | S | * | 2/2009 | Ishii | D10/66 |
| D609,124 | S | * | 2/2010 | Ishii et al. | D10/66 |
| D612,753 | S | * | 3/2010 | Ishii et al. | D10/66 |
| D635,038 | S | * | 3/2011 | Ishii | D10/66 |
| D642,485 | S | * | 8/2011 | Riegl | D10/66 |
| 8,290,618 | B2 | * | 10/2012 | Demopoulos | 700/245 |
| 2012/0170029 | A1 | * | 7/2012 | Azzazy et al. | 356/139.04 |

FOREIGN PATENT DOCUMENTS

| | | |
|---|---|---|
| EM | 001762782-0001 | * 10/2010 |
| EM | 001762782-0002 | * 10/2010 |
| EM | 001918251-0001 | * 9/2011 |

* cited by examiner

*Primary Examiner* — Karen E Eldridge Powers
(74) *Attorney, Agent, or Firm* — Hoffmann & Baron, LLP

(57) CLAIM

The ornamental design for a laser scanner, as shown and described.

DESCRIPTION

FIG. 1 is a perspective view of a first embodiment of a laser scanner constructed in accordance with the invention;
FIG. 2 is a front elevational view of the 1 laser scanner shown in FIG. 1, the rear elevational view being identical to the front elevational view;
FIG. 3 is a side elevational view of the laser scanner shown in FIG. 1;
FIG. 4 is a top plan view of the laser scanner shown in FIG. 1;
FIG. 5 is a perspective view of a second embodiment of a laser scanner constructed in accordance with the invention;
FIG. 6 is a front elevational view of the laser scanner shown in FIG. 5, the rear elevational view being identical to the front elevational view;
FIG. 7 is a side elevational view of the laser scanner shown in FIG. 5; and,
FIG. 8 is a top plan view of the laser scanner shown in FIG. 5.

1 Claim, 8 Drawing Sheets

Figure 1:
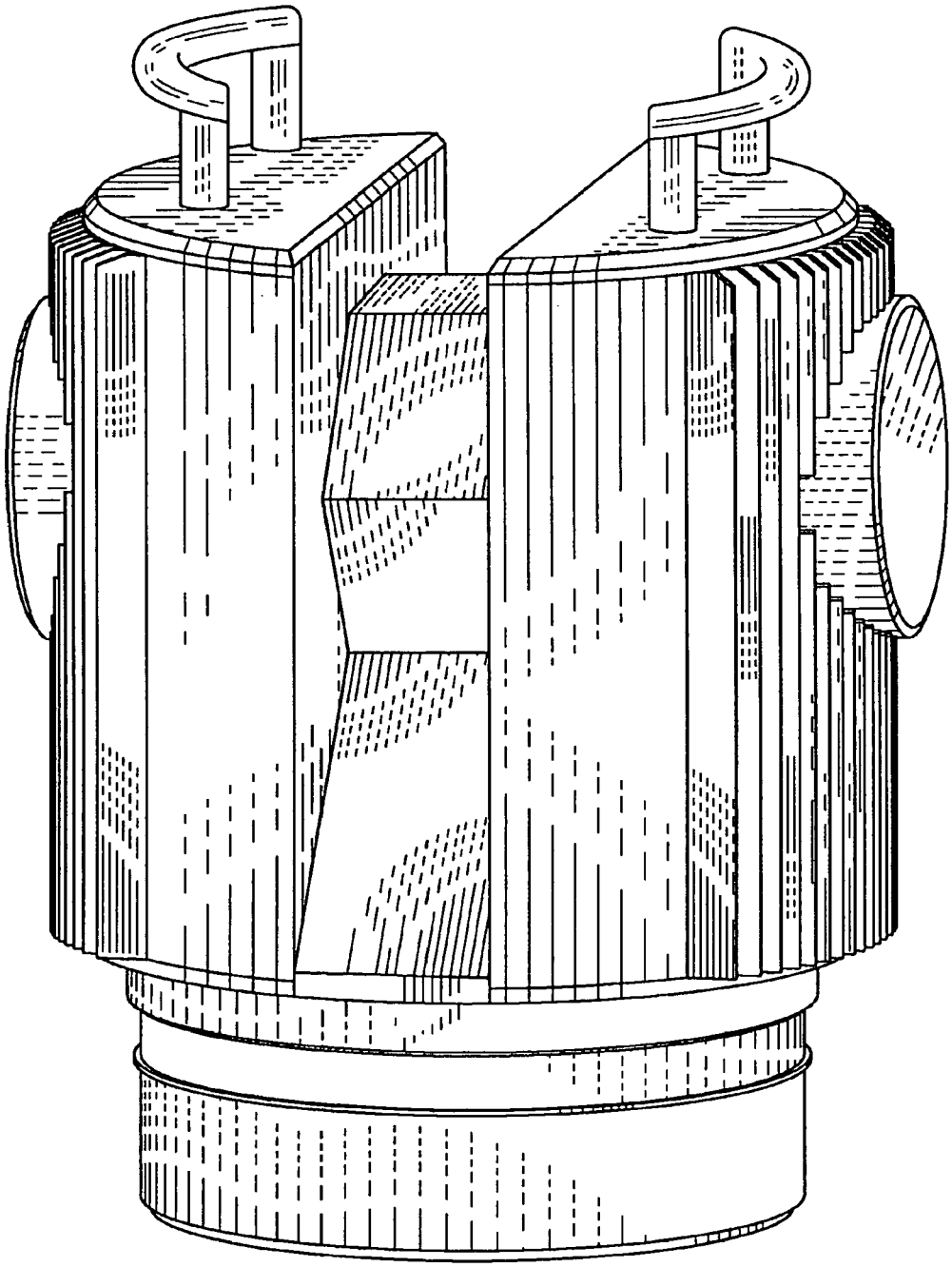
Figure 2:
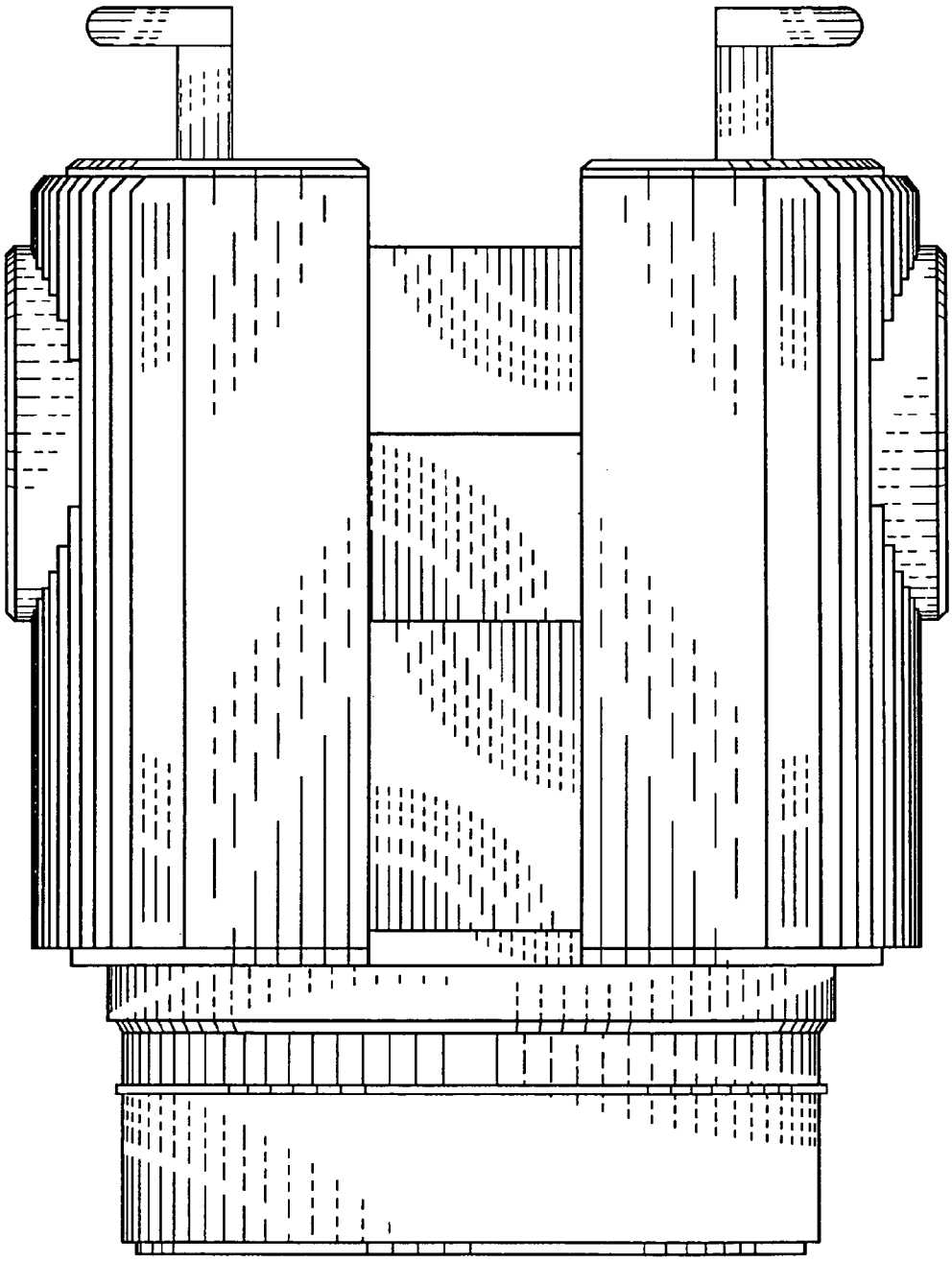
Figure 3:
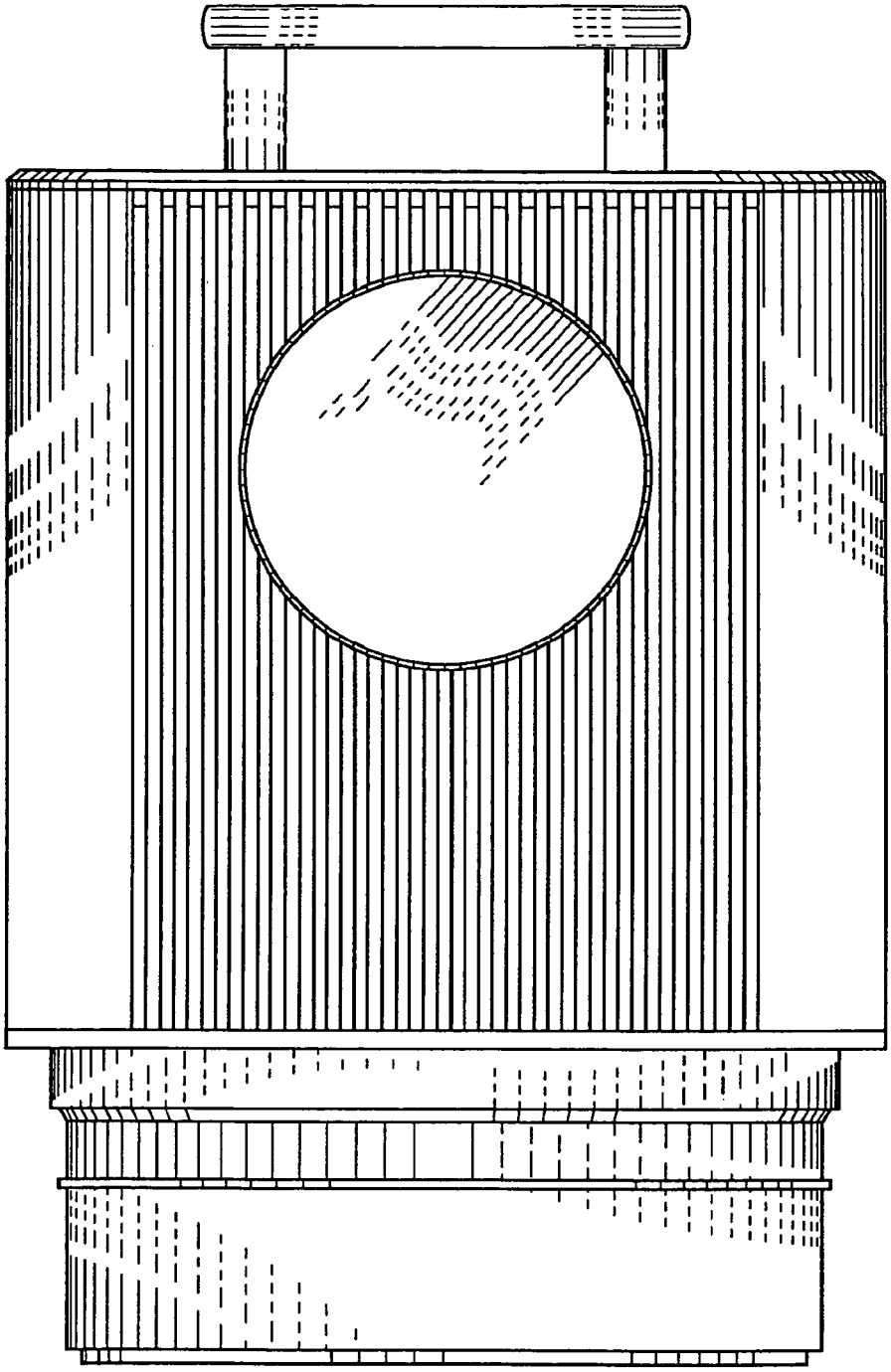
Figure 4:
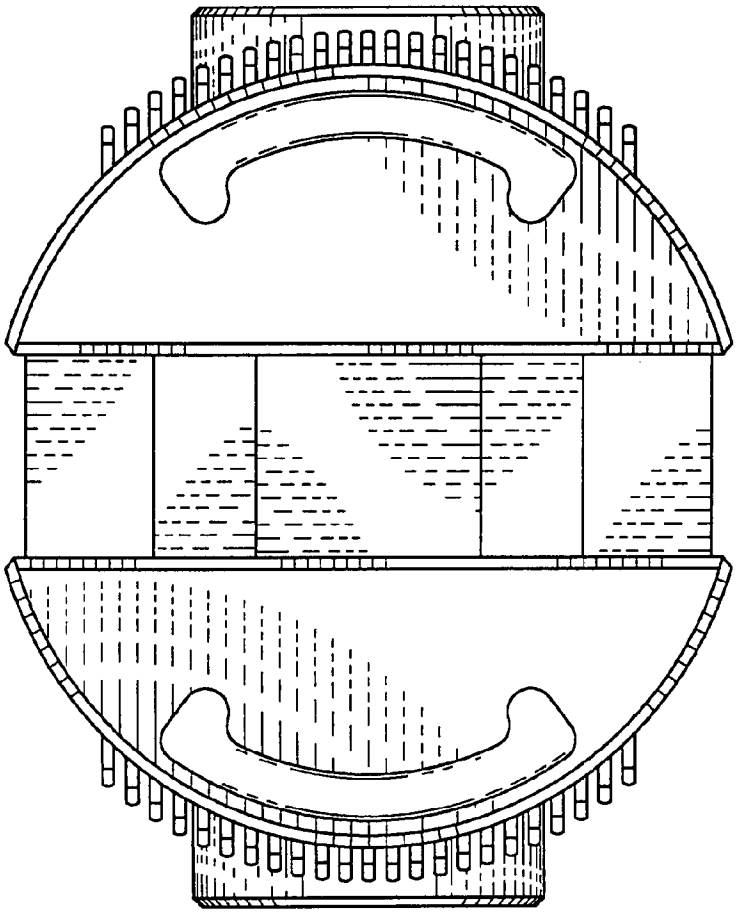
Figure 5:
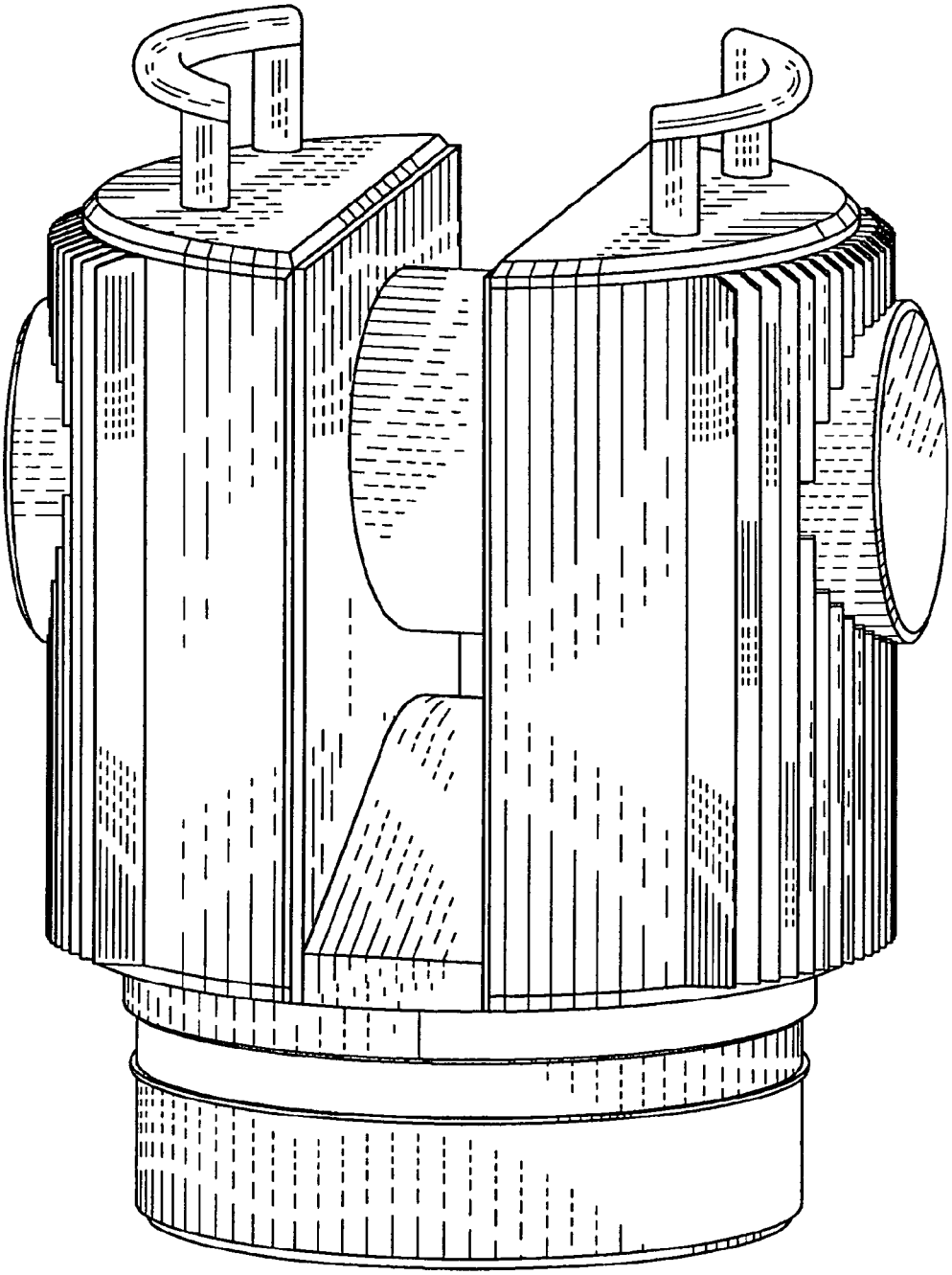
Figure 6:
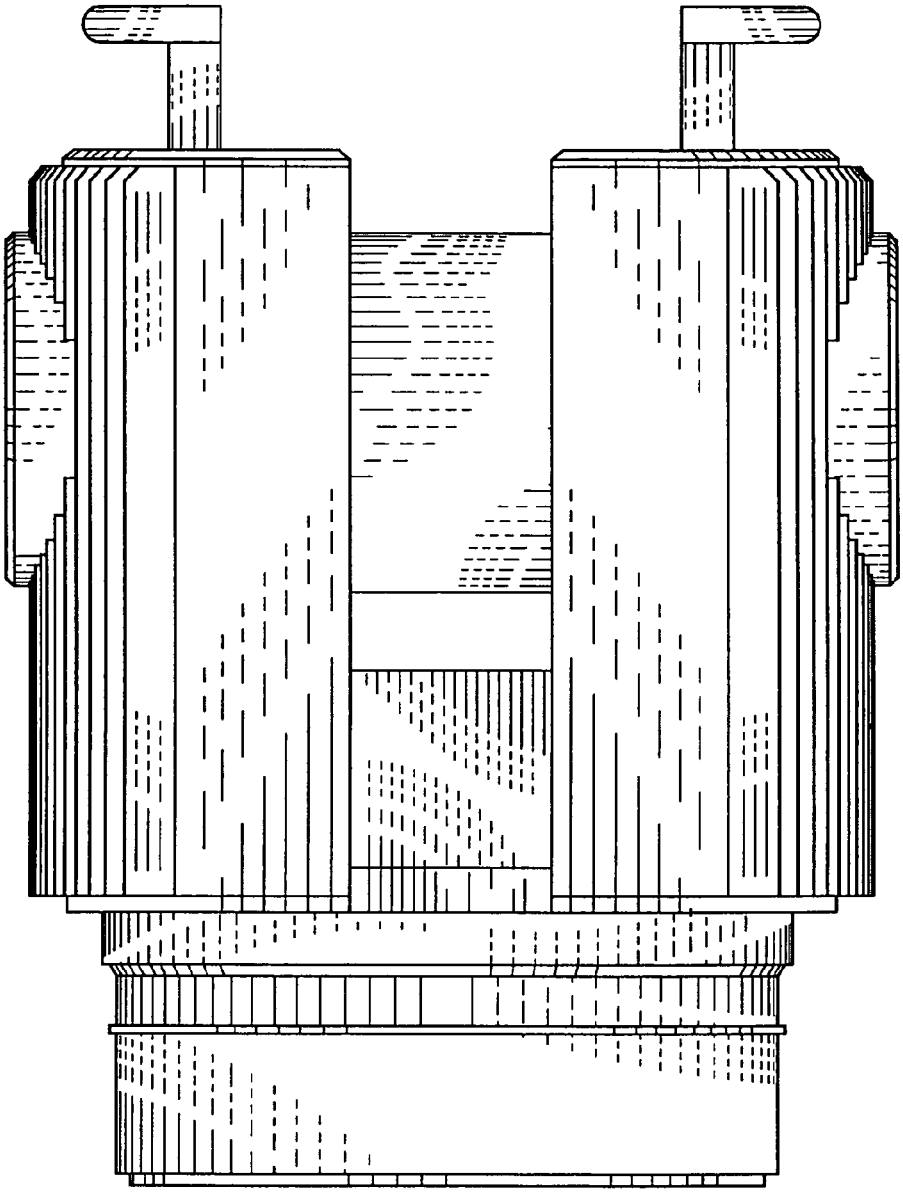
Figure 7:
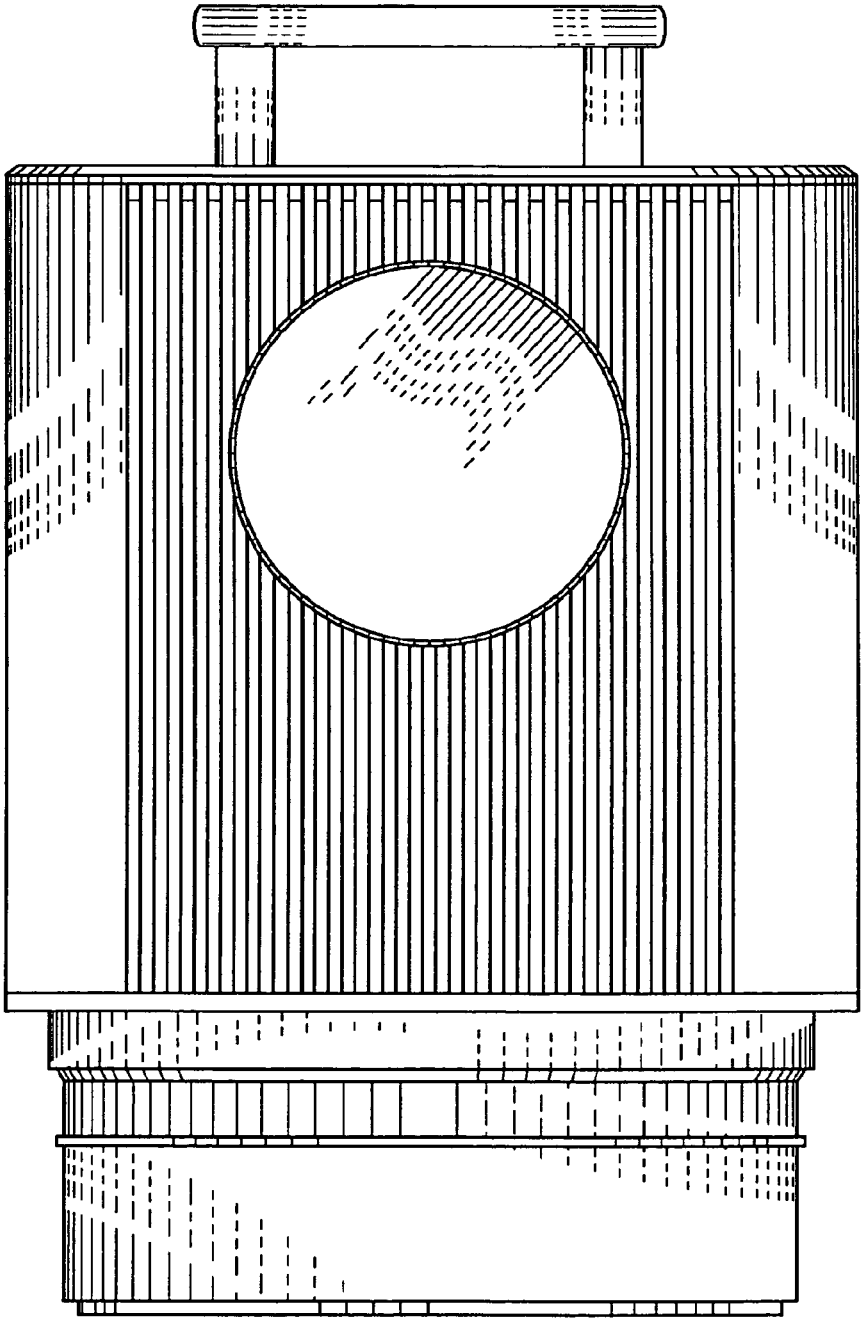
Figure 8:
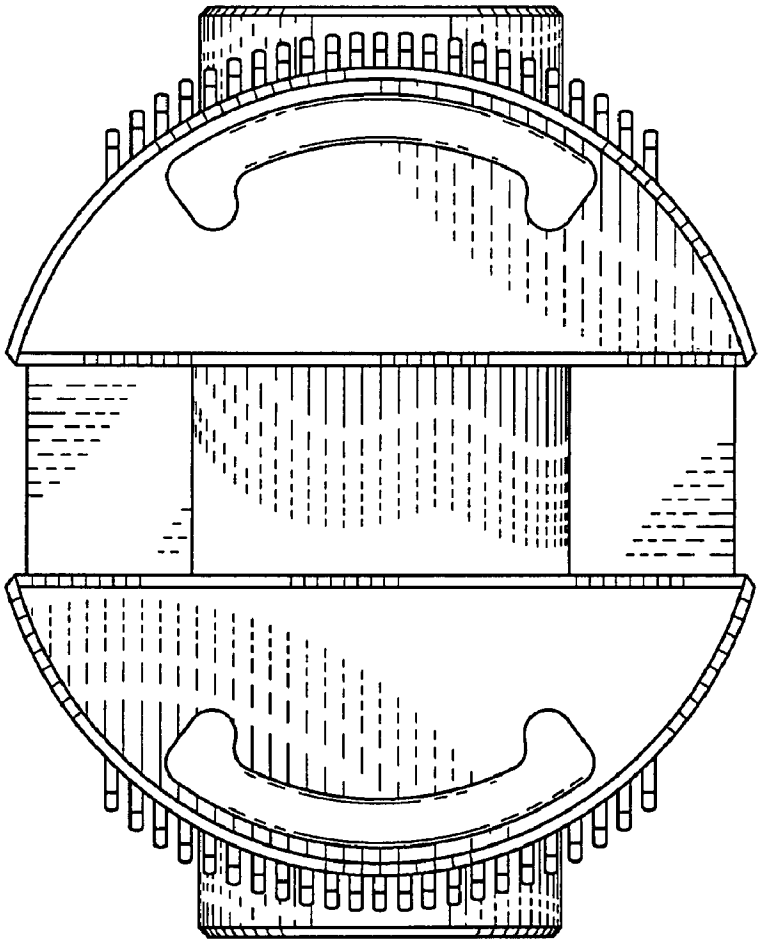

Matter enclosed in heavy brackets [ ] appears in the original patent but forms no part of this reissue; matter printed in italics indicates the additions made by reissue.